UNITED STATES PATENT OFFICE.

LEONHARD ERASMUS, OF RIGA-THORENSBERG, RUSSIA.

PROCESS FOR OBTAINING A SOLID MASS OUT OF CHEESE-CURDS.

964,504.

Specification of Letters Patent.

Patented July 19, 1910.

No Drawing.

Application filed November 22, 1909. Serial No. 529,437.

*To all whom it may concern:*

Be it known that I, LEONHARD ERASMUS, hereditary honorary citizen, a subject of the Czar of Russia, residing at Riga-Thorensberg, in the Empire of Russia, have invented certain new and useful Improvements in Processes for the Obtaining of a Solid Mass Out of Cheese-Curds; and I do hereby declare the following to be a full, clear, and exact description of the invention, such as will enable others skilled in the art to which it appertains to make and use the same.

From the German patent, No. 32,293, dated October 28, 1884, is already known a process for making a solid mass from curds of milk or from casein consisting in kneading the curds or casein in hot water below boiling, temperature until the curds or casein becomes glutinous and ductile, and another process is also known consisting in mixing dry casein with water, then heating the mixture to the temperature of boiling water and kneading until the product becomes glutinous and ductile, after which in both cases the mass so obtained is pressed in molds. The resulting solid mass remains, however, even after the usual treatment with formalin, brittle enough and contains often air bubbles and is not of a uniform structure. The reason thereof lies in the fact that the curds or casein brought into this state, being insoluble in water, notwithstanding their relative glutinosity and ductility, becomes, when kneaded, pressed in layers the surfaces of which being moistened with water do not everywhere closely adhere one to another so that in the resulting piece remain microscopical spaces. During the pressing process the air and moisture retained in these spaces, owing to the close adhesion between the particles of the glutinous and ductile mass, cannot escape therefrom and the resulting product becomes therefore of an ununiform structure; furthermore the air and moisture retained in the pores, owing to atmospheric influences and changes of temperature, occasions in time alterations in the form and quality of the product which becomes bent and split.

The object of this invention is to prevent all the defects above mentioned and to enable to obtain from the curds of a uniform solid mass which does not become deteriorated and altered in time under the influence of changes of temperature and atmosphere.

This invention is based upon applicant's discovery that if the curds, in their natural condition and without the addition of water, are heated to about 100° C., they possess absolutely different properties than curds slightly heated, or curds treated with water, or both.

At the temperature of boiling water casein forms as before stated, a glutinous and ductile mass and only after a prolonged heating at this temperature forms a mass like gruel. The curds which were not squeezed out or which contain about 50–60% of moisture and in which state they easily crumble, when gradually heated discharge at first the water contained in them and become soft as a dough, then become more and more ductile, but, if the heating is still being continued, lose this ductility and the mass forms a granulated gruel of which the grains, although they can be easily pressed together, are not ductile. In this state the mass, according to the present invention, is justly adapted to treatment by pressing as the separate particles easily allow the water and the air to pass through them; the resulting product does not contain therefore vacuous spaces, does not consist of layers, but on the contrary is of a structure uniform in all directions.

It is to be noted, that the curds heated to 60° C. and not having yet become ductile are also in the state of a gruel. But the products obtained therefrom are brittle and not durable.

The present invention comprises thus a process consisting of the following: The curds in the form of little pieces containing about 60% of moisture or more are heated without adding water and constantly mixing with a shovel or like mixing device and boiled until they lose the ductility and glutinosity, which they acquired at the beginning of the heating process, and are transformed into a granulated gruel; the latter is then pressed in molds permitting of the escape of the air and moisture, then dried and treated in the usual manner with formaldehyde. This process therefore differs both from the processes of treating casein and curds hitherto known, according to which the suitable state for the pressing operation is considered the glutinous-and-ductile state as well as from the process which I have proposed in my prior Russian application for a patent No. 34763 and according to which the curds were either dried, ground and mixed with water and then heated, as described, or, without being previously dried were directly mixed with water and heated.

Contrary to the latter, the present process does not require any addition of water to the curds. As to the sticking of the heated mass to the walls of the receptacle, this is being prevented in a sufficient manner by the moisture contained in the curds.

The resulting product is a solid mass closely resembling celluloid. It may be shaped and used as a substitute for tortoise shell, ivory, horn, bone, marble, decorative tiles, terra cotta ornaments, etc.

I claim:—

The process of making a solid mass from curds, which consists in gradually heating a mass of curds in its natural condition to about 100° C., at atmospheric pressure constantly stirring the mass during the heating operation, thereby transforming the mass into a granulated gruel, pressing the mass in molds, and then drying it and treating it with formaldehyde, substantially as described.

In testimony whereof, I affix my signature, in presence of two witnesses.

LEONHARD ERASMUS.

Witnesses:
EGON OBERBERSTNER,
VIKTOR BUJWID.